No. 832,913. PATENTED OCT. 9, 1906.
F. R. KUNKEL.
FAN MOTOR ADAPTER.
APPLICATION FILED AUG. 2, 1905.
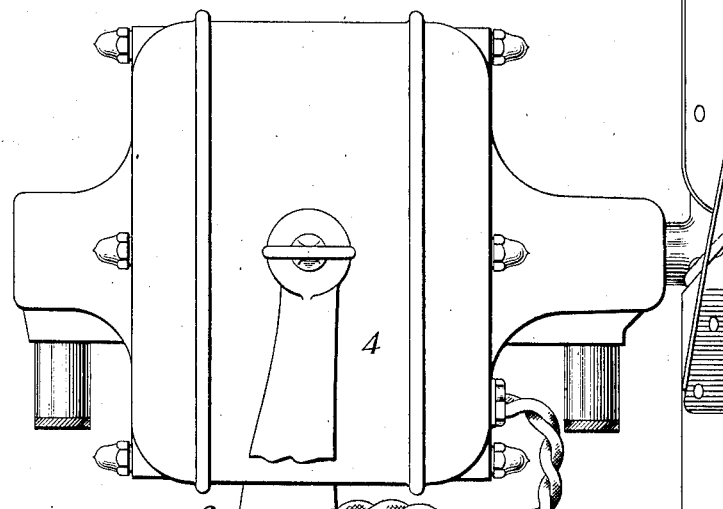
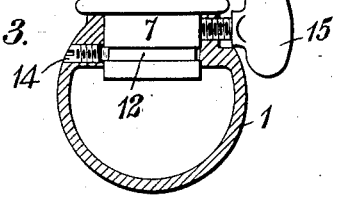
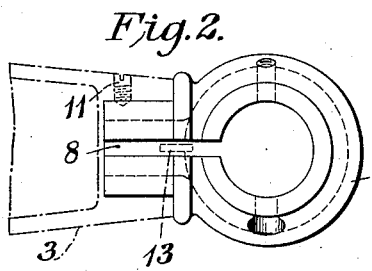
WITNESSES:
C. L. Belcher
R. J. Dearborn
INVENTOR
Fred R. Kunkel
BY
Wesley G. Carr
ATTORNEY

UNITED STATES PATENT OFFICE.

FRED R. KUNKEL, OF WILKINSBURG, PENNSYLVANIA, ASSIGNOR TO WESTINGHOUSE ELECTRIC & MANUFACTURING COMPANY, A CORPORATION OF PENNSYLVANIA.

FAN-MOTOR ADAPTER.

No. 832,913.    Specification of Letters Patent.    Patented Oct. 9, 1906.

Application filed August 2, 1905. Serial No. 272,439.

*To all whom it may concern:*

Be it known that I, FRED R. KUNKEL, a citizen of the United States, and a resident of Wilkinsburg, in the county of Allegheny and State of Pennsylvania, have invented a new and useful Improvement in Fan - Motor Adapters, of which the following is a specification.

My invention relates to means for adapting a bracket to be mounted either in alinement with its base or at an angle of substantially ninety degrees therewith, and particularly to means for adapting a relatively small electric motor for mounting in either a vertical or a horizontal plane.

The object of my invention is to provide an adapter for a motor-bracket that shall be simple and durable in construction and permit a rotary adjustment about the center line of the bracket and that may be inserted or removed without disconnecting the supply-conductors which ordinarily pass through the hollow bases and brackets of such motors.

In the prior art relatively small power-motors or fan-motors were usually constructed with hollow bases and brackets, through which the motor-leads were passed, the two portions being assembled in alinement for mounting on a horizontal plane and provided with an elbow-adapter for mounting on a vertical plane. With this arrangement it was necessary to disconnect the motor-leads and pull them through the adapter whenever the mounting was changed from the one plane to the other. To obviate this objectionable feature, the adapter of my invention is provided with a slot cut through one wall in such a manner that the adapter may be inserted or removed without disconnecting the supply-conductors.

My invention is illustrated in the accompanying drawings, in which—

Figure 1 is a side elevation of a motor provided with an adapter constructed in accordance therewith, the base and bracket being shown partially in section to disclose the adapter; and Figs. 2 and 3 are respectively a plan and a sectional elevation of the adapter of Fig. 1.

Referring to the drawings, an adapter 1 is inserted between a bracket 2 and the supporting-base 3 of a motor 4 and comprises a hollow elbow, which is provided with a portion 5, that engages a socket in the base 3, and with a socket 6 to receive the end portion 7 of the bracket 2. The adapter 1 is provided with a slot or saw-cut 8, through which a plurality of conductor-leads 9 and 10 may pass. The portion 7 of the bracket 2 which engages the socket 6 of the adapter 1 has the same form and dimensions as the portion 5 of the adapter 1, so that it may engage the base 3 when the adapter is removed, in which case the bracket will be supported in alinement with the base.

When the adapter is omitted, the bracket 2 is rotatably mounted directly upon the base and is fastened thereto by a set-screw 11, which is threaded into the base and engages a groove 12 in the portion 7 of the bracket.

The adapter 1 may be clamped to the base by the set-screw 11 and is provided with a pin 13, which engages a small hole in the base 3 and serves to prevent the rotation of the adapter about the center line of the base. The motor-bracket, however, is rotatably mounted with respect to the adapter, a set-screw 14 being provided to engage the groove 12 in the portion 7 of the bracket; but the two parts may be clamped together by means of a thumb-screw 15, which is screw-threaded into the adapter 1.

I desire that all variations in size, form, or arrangement of details which effect similar results and which do not materially depart from the spirit of my invention shall be included in its scope.

I claim as my invention—

1. A motor-adapter that comprises a hollow elbow having a slot through which the circuit connections of the motor may pass when the adapter is removed.

2. A motor-adapter that comprises a hollow elbow having a slot in one side thereof.

3. The combination with an electric motor, a hollow bracket, a hollow base therefor, and a plurality of conductor - leads that pass through said hollow members, of a removable adapter which connects the bracket with the base and is provided with a slot through which the leads may pass when the adapter is removed.

4. The combination with an electric motor, a hollow bracket, a hollow base therefor, and one or more conductor - leads that pass through said hollow members, of an adapter that determines the angle between the center lines of the bracket and the base and is provided with a slot through which the leads may pass when the adapter is removed and replaced.

5. The combination with an electric motor, a hollow bracket, a hollow base therefor, and one or more conductor-leads that pass through said hollow members, of an adapter comprising a hollow lead-connector which supports the motor-bracket in a line that is substantially perpendicular to the center line of the base, said hollow connector being provided with a slot or cut through which the leads may pass when the adapter is removed and replaced.

6. The combination with an electric motor, a hollow bracket, a hollow base therefor, means for supporting said bracket in alinement with said base, and one or more conductor-leads that pass through said hollow members, of an adapter comprising an elbow that may be inserted between the base and bracket and supports the bracket at an angle of substantially ninety degrees to the center line of the base, said elbow being provided with a cut through which the leads may pass when the adapter is inserted or removed.

7. The combination with an electric motor, a hollow bracket, a hollow base therefor, and one or more conductor-leads that pass through said hollow members, of an adapter that comprises a hollow elbow provided with a socket which is engaged by the end of the hollow bracket and with a portion that engages a socket in said hollow base, said adapter being provided with a slot or cut through which the leads may pass when it is removed and replaced.

8. A hollow adapter for electric motors that is open at both ends and has a side slot for the insertion and removal of conductors.

In testimony whereof I have hereunto subscribed my name this 31st day of July, 1905.

F. R. KUNKEL.

Witnesses:
W. C. STARKEY,
BIRNEY HINES.